Figure 1:
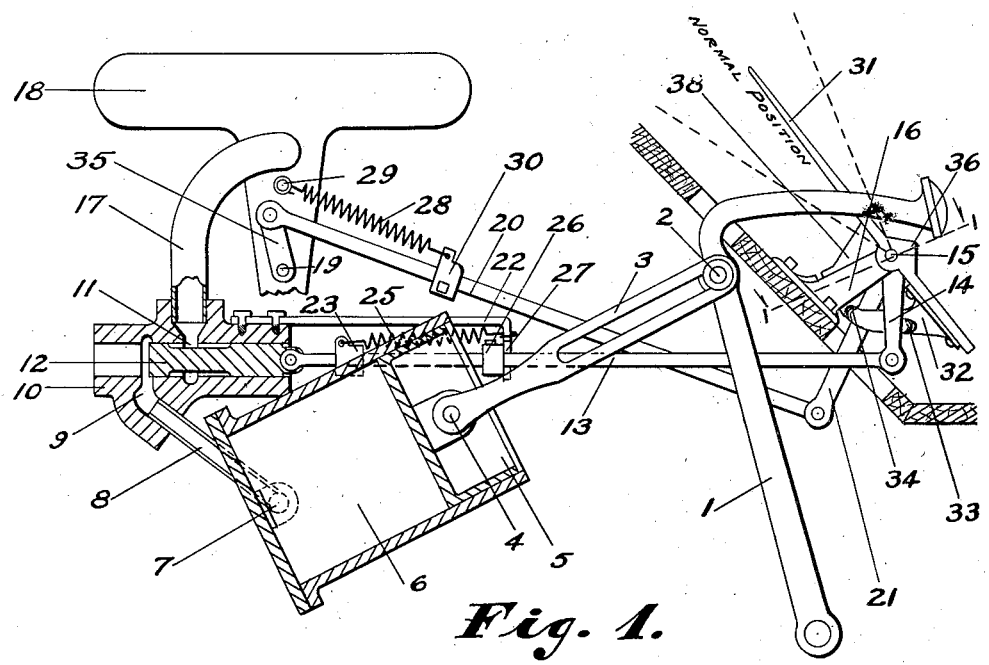

Nov. 8, 1932.          R. G. COATES          1,887,231
CONTROL MECHANISM FOR MOTOR CARS
Filed Sept. 10, 1930

Ray G. Coates
Inventor

Patented Nov. 8, 1932

1,887,231

UNITED STATES PATENT OFFICE

RAY G. COATES, OF PASADENA, CALIFORNIA

CONTROL MECHANISM FOR MOTOR CARS

Application filed September 10, 1930. Serial No. 480,962.

My invention relates to motor cars and more particularly to the means for controlling the governing mechanism of a motor car driven by an internal combustion engine.

Heretofore the clutch has been controlled either manually or by power manually controlled. In some designs the preliminary movement of the clutch pedal causes a piston to move the clutch lever, thus removing from the driver the heavy work of compressing the clutch spring. In other designs the act of closing the throttle by releasing the accelerator has initiated the operation of a piston to open the clutch. In the first of these designs the foot of the driver must shift from the accelerator to the clutch pedal. In the second when the accelerator is free and the engine is throttled the clutch is open and this is frequently objectionable.

These objections I remove by combining the mechanism for opening the clutch and for feeding fuel to the engine so that the fuel may be fed to or cut off from the engine and the clutch opened or closed without removing the foot from its position, and also permitting the clutch to be engaged when the engine is throttled, a condition frequently desirable. In normal operation of power controlled clutches the only work done by the driver in disengaging the clutch is that of moving the control member governing the power mechanism used to open the clutch. This work is no greater than that of operating the accelerator. In my improvement the clutch may be held open indefinitely with very little effort, which is a very great convenience in traffic.

My invention may be applied in many ways. The drawing is illustrative of one method of construction and is not intended as a limitation to that particular form. I contemplate applying it in all forms in which it may be useful.

Figures 2, 3:
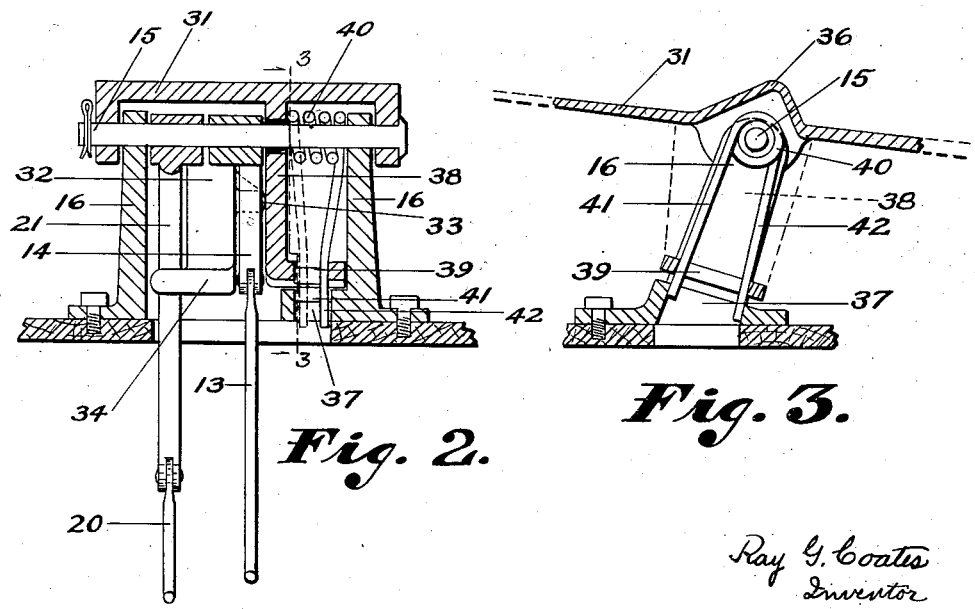

In the drawing Figure 1 represents, diagrammatically, a general view of my invention. Parts of the view are in section where the operation will be rendered more clear. Figure 2, on a larger scale, shows a sectional view of a part of Figure 1 on the line 1—1, the point of view being parallel with the floor boards, as indicated by the small arrows. Figure 3 is a sectional view of Figure 2 on the line 3—3 showing the "biasing" spring which keeps the pedal in "normal position".

In the figures 1 represents a clutch controlling lever, here shown as the common clutch pedal. This lever carries a pin, 2, over which the link, 3, passes. The other end of the link 3 is connected by the pin 4 to the piston 5, which reciprocates in the cylinder 6, this latter being attached in a suitable manner to the chassis or engine so that the proper relations are maintained with the fulcrum of the clutch lever 1. A port 7 by way of the conduit 8 connects the cylinder 6 with the port 9 of the valve body 10, and this latter has an additional port 11 connecting by the conduit 17 with the intake manifold 18 of the engine of the car. In the valve body 10 the valve 12 covers the port 11 and also, when moved to the left, connects the ports 9 and 11 together, thereby opening a communication between the cylinder 6 and the intake manifold 18 of the engine. The valve 12 is connected to the valve rod 13 and the right hand end of this latter is connected to radius member 14, and this latter is centered on the pin 15. Secured to the valve body 10 is an extension member 22 which is forked at the right hand end and bent down so as to loosely embrace the valve rod 13. Rod 13 carries two collars one, 23, which restrains one end of the spring 25 and the other, 26, which acts as a stop to the movement of the valve rod toward the right by coming in contact with the sides of the turned down ends of the extension member 22 at the point 27. The other end of the spring 25 is secured to the right hand end of the member 22. The spring 25 should have enough stress to maintain the valve 12 in the position shown and should be long enough to allow full stroke to the valve 12 without much increase in the spring stress.

In the conventionally indicated manifold, 18, is, also conventionally indicated, a throttle valve, 19, which may be of any variety, but is here illustrated as the "butterfly" type that closes against its seat and thus acts as a stop to its own motion. The throttle lever 35, controlling valve 19, is connected by the rod 20 to the radius member 21, this latter being also centered on the pin 15. On the rod 20 is a collar, 30, to which one end of the tension spring 28 is secured, the other end of this spring being secured to the intake manifold at 29, or at some other suitable place. The spring 28 should have enough stress to promptly seat the throttle valve when the latter is released. The columns 16—16 which support the pin 15 are secured firmly to the chassis structure near the usual position of the accelerator. The pin 15 carries the double acting pedal 31. To the under side of this pedal and near its lower end the member 32 is firmly secured. This member carries two horns, one of which, 33, engages the radius member 14 when the lower end 31 is depressed from its "normal position", and the other, 34, engages the radius member 21 when the upper end of 31 is depressed from the "normal position". When the valve 12 is in the position shown in Figure 1 and when the throttle is closed so that the engine is simply "idling" then the horn 33 should just touch the radius member 14 and the horn 34 should be just ready to contact with the radius member 21. This is the "normal position" of the pedal 31. The throttle is closed (engine "idling") and the clutch is engaged.

It will now be seen that if the foot of the driver of the car is on pedal 31, with the pedal rib or "finder" 36 about under his instep, that pressure with the forward part of the foot will move the horn 34 to the right thus carrying member 21 with it and will thus open the throttle and speed up the engine, as with the usual accelerator. If the heel of the driver is depressed (the pedal being in "normal position") the valve 12 will open communication so that the cylinder will be vented into the intake manifold, the piston 5 will move back, carrying the link 3, pin 2, and lever 1 to the left, thereby releasing the clutch. So long as the heel of the pedal 31 is maintained depressed the piston 5 will hold the clutch open. If the pedal 31 is brought back to "normal position" by the combined action of the foot and springs, or by the latter alone, the valve 12 will again cut off the communication with the intake manifold and vent the cylinder to the atmosphere thereby permitting the clutch spring to close the clutch and also restore the piston and clutch pedal to the positions shown in Figure 1.

It is desirable that the pedal 31 should have a definite normal position so that the driver will readily perceive the point at which the throttle is closed and the clutch not open. This may be accomplished by making each spring (25 and 28) of such a strength that when the pedal starts to move from the "normal position" the effort of moving either the radius member 14 or 21 will give sufficient notice of such movement. If the "hand throttle", which is commonly connected to the same throttle valve as that to which the accelerator is connected, is set so that the engine is doing more work than "idling" then the throttle spring may not support the pedal 31 in its normal position. To maintain the pedal 31 in its normal position when the throttle is opened by other means than by the pedal 31 itself, a special spring may be used. On one of the columns 16 (see Figures 2 and 3) a slot 37 is formed in the base of the fixture. The length of the slot is parallel with the longitudinal axis of the pedal 31. Projecting downward from the under side of the pedal 31 is an arm 38 carrying a laterally turned lower end which carries a slot 39. The slots 39 and 37 register with each other when the pedal 31 is in normal position. The slot 39 is enough nearer the center of pin 15 to allow the pedal 31 free movement without the arm 38 coming in contact with any part of the fixture. Around the pin 15 is wound the spring 40 and its two ends, 41 and 42, are made long enough to reach through the slot 39 and well into the slot 37. The spring 40 should be stressed before inserting in the position shown.

If the pedal 31 moves, in either direction, from the "normal position" then the arm 38 will also move and the slot 39 will move more or less out of register with the slot 37, and this will bring the two ends of the spring 40 nearer together, resulting in increase of stress on the spring. The ends 41 and 42 should contact with both slots when 31 is in "normal position." This will give to pedal 31, when in "normal position", a stability depending on the amount of initial stress put on the spring 40.

With the spring 40 installed the other springs, 25 and 28, need be no stronger than required to close their respective valves. The total amount of force required to move pedal 31 will be but a fractional part of that required to handle the car by the present methods.

When the engine is not running, or in any emergency, the clutch can be opened by the usual foot pressure on the pedal of lever 1. The pin 2 then slides down the slot of the connection 3 and the piston need not move.

The clutch should not begin to open until after the throttle has closed. This separates the actions of closing the throttle and opening the clutch so that either action may be performed alone, or, by quickly pressing down with the heel, the acts may be performed in rapid succession. Thus the operations of feeding fuel, cutting it off, opening the clutch or closing the clutch, may all be performed without moving the foot from its position, and the engine may be used as a brake without any special provision.

It is common in this art for the accelerator to be unable, when released, to close the throttle valve to a point lower than that indicated by the hand throttle. In this specification it is understood that when the pedal 31 is released the throttle automatically closes to the minimum allowed by the position of the hand throttle.

I claim:

1. The combination of a clutch controlling member, a clutch motor operatively connected to said member, a throttle connected to an intake manifold, a pedal capable of being moved in opposite directions from a normal intermediate position and adapted to automatically return to said normal position when released, a connection between said pedal and said throttle, said pedal being adapted to move said throttle by movements of said pedal on one side of said normal position of said pedal, a control element for said clutch motor, a connection between said control element and said pedal, said pedal being adapted to govern said control element by movements of said pedal on the other side of said normal position of said pedal.

2. In a motor car control system the combination of a pedal capable of being moved in opposite directions from a normal intermediate position and adapted to automatically return to said normal position when released, a throttle, means to connect said throttle to said pedal, a clutch controlling member, a clutch motor element, means to connect said clutch motor element to said member, a clutch motor element control, means to connect said clutch motor element control to said pedal, said pedal connections adapted to close said throttle to the released position and to maintain said clutch motor element control in the position of clutch engaged when said pedal is in normal position.

3. The combination of a clutch controlling member, a clutch motor, an operative connection between said motor and said member, a clutch motor control, a throttle, a pedal capable of being moved in opposite directions from a normal intermediate position and adapted to automatically return to said normal position when released, means to connect said pedal to said throttle, a second means to connect said control to said pedal, said pedal adapted to open said throttle only when said motor control is in the position of clutch engaged and adapted to move the said control to clutch disengaged position only when the foot throttle is in released position.

4. The combination of a clutch controlling member, a piston operatively connected to said member, a cylinder closed at one end in advance of the piston and in which said piston moves, an intake manifold, a conduit between said manifold and said cylinder, a valve in said conduit adapted to vent said cylinder into said manifold or to admit atmospheric pressure to said cylinder, a throttle adapted to control the admission of fuel to said manifold, a pedal yieldably maintained in a normal position, means, operable by movements of said pedal on one side of said normal position, to connect said pedal to said valve, and means, operable by movements of said pedal on the other side of said normal position, to connect said pedal to said throttle.

RAY G. COATES.